United States Patent Office 3,697,424
Patented Oct. 10, 1972

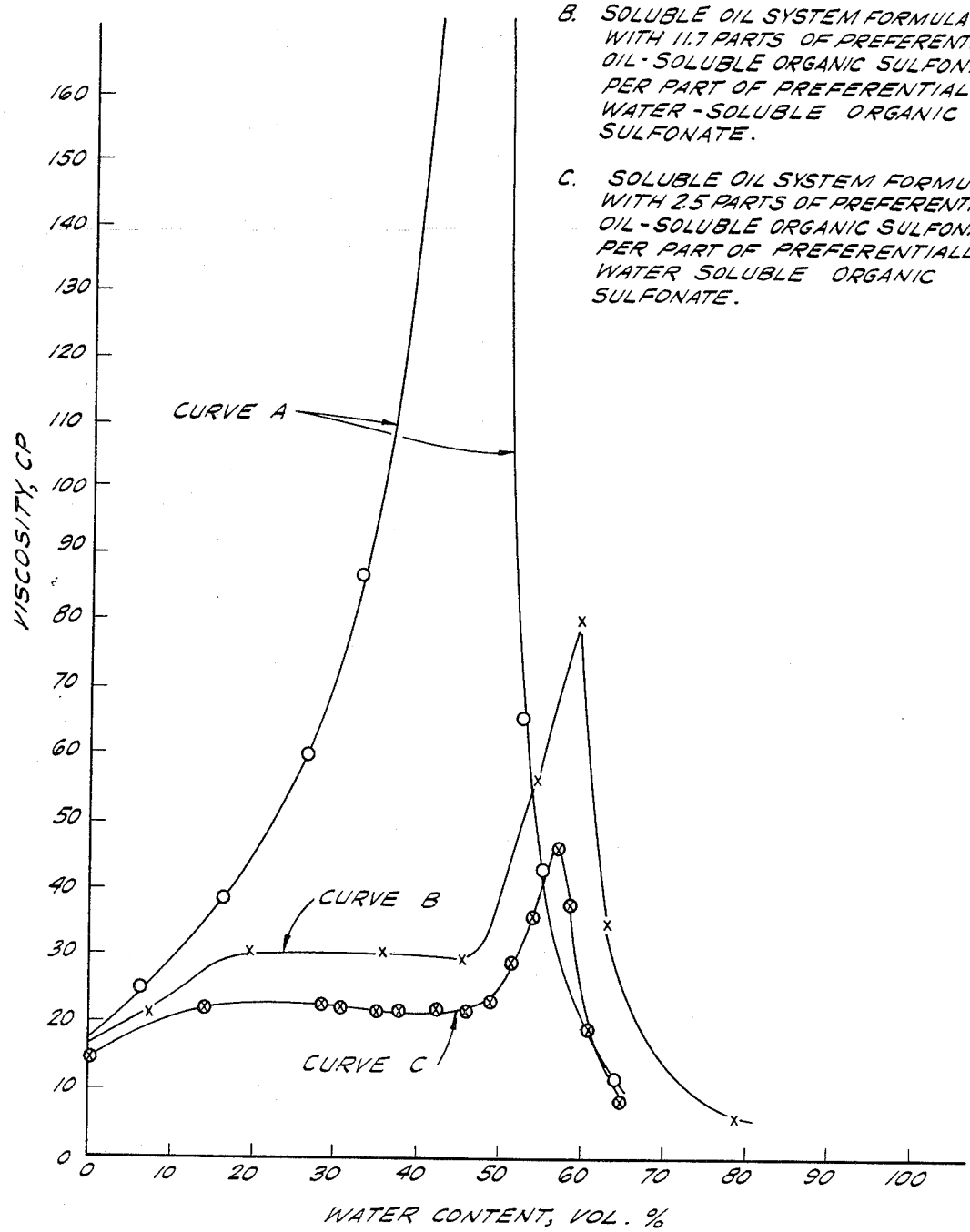

3,697,424
SOLUBLE OIL COMPOSITION
Le Roy W. Holm, Fullerton, Calif., assignor to Union Oil Company of California, Los Angeles, Calif.
Continuation-in-part of application Ser. No. 713,496, Mar. 15, 1968, now Patent No. 3,500,919. This application Dec. 31, 1969, Ser. No. 889,640
The portion of the term of the patent subsequent to June 27, 1989, has been disclaimed
Int. Cl. C09k 3/00; E21b 13/22
U.S. Cl. 252—8.55 D
26 Claims

ABSTRACT OF THE DISCLOSURE

A soluble oil composition comprising a liquid hydrocarbon, a preferentially oil-soluble organic sulfonate, a preferentially water-soluble organic sulfonate, and a stabilizing agent is disclosed. The composition has particular utility as a displacement fluid in a flooding process for the recovery of oil. The soluble oil composition can be substantially anhydrous, or it can contain water present as a water-in-oil microemulsion.

---

This is a continuation-in-part of application Ser. No. 713,496 filed Mar. 15, 1968, and now issued as Pat. No. 3,500,919.

This invention relates to the recovery of oil from subterranean petroleum reservoirs, and more particularly to an improved displacement fluid composition for use in a flooding process for the recovery of petroleum.

It has long been recognized that substantinal amounts of oil remain unrecovered in the reservoir at the completion of normal primary recovery operations. Hence, various secondary methods of recovering additional qualities of oil have been proposed, such as the well-known techniques of water flooding in which water is injected into the reservoir through an injection well to drive additional oil toward one or more production wells spaced apart in the reservoir from the injection well. Although an additional quantity of oil can often be recovered by waterflooding, the efficiency of the water flood and the ultimate oil recovery can be further improved by introducing a solvent that is miscible with both the connate oil and with the flood water into the reservoir ahead of the flood water.

One particular solvent system that has been suggested for use with a water drive comprises a mixture of substantially anhydrous soluble oil and an inert, nonaqueous solvent, preferably admixed in such proportions that the viscosity of the mixture approximates the viscosity of the formation oil. The soluble oil consists of a hydrocarbon phase; one or more soaps or non-soap surface active materials; and a stabilizing agent which is usually a monohydric or polyhydric alcohol, or other partially oxygenated, low molecular weight hydrocarbon, such as a ketone. The soluble oil often contains some free organic acid, and especially a fatty acid, such as oleic acid.

It has also been proposed that the flood water be preceded by a microemulsion consisting of a soluble oil containing substantial quantities of water, such as from about 10 to 50 percent or more water. These microemulsions are relatively stable, transparent emulsions of the water-in-oil type, i.e., oil is the continuous phase and extremely small droplets of water are dispersed therein.

It is well known that soluble oils spontaneously absorb or "take up" water when contacted therewith forming water-in-oil microemulsions, and that the viscosity of the soluble oil increases sharply as it takes up water. Water take up by the soluble oil can occur both on the addition of water to the soluble oil prior to injection into the formation and on the injected soluble oil contacting water in the reservoir. Not only is difficulty experienced on injecting these high viscosity soluble oils and microemulsions into the reservoir, but more seriously, unfavorable mobility ratios exist in the reservoir between the viscous miscible displacement fluid and subsequently injected flood water causing excessive fingering of the drive fluid into the more viscous miscible displacement fluid.

Although various types of hydrocarbons have been suggested for the preparation of soluble oils, in most applications, both where the soluble oil is injected in the anhydrous form and as a microemulsion, economics favor preparation of the soluble oil from a petroleum crude oil which can be a crude oil previously produced from the reservoir to be treated, or which is otherwise conveniently available, or from other relatively viscous hydrocarbon fractions. However, the problem of viscosity increase on water take up is particularly acute with these more viscous hydrocarbons and it has heretofore been necessary to use more costly, lower boiling hydrocarbons, such as gasoline and LPG, as the hydrocarbon base in the preparation of the soluble oils and microemulsions useful as displacement fluids, or to dilute the more viscous soluble oils and microemulsions with expensive solvents. Thus, need exists for an economical solvent system that has a mobility approximating the mobility of the reservoir oil, that does not greatly decrease in mobility on water take up, and that effects high oil recovery when followed by a water drive.

Accordingly, it is a principal object of this invention to provide an improved displacement fluid for the recovery of petroleum from subterraneon reservoirs. Another object of the invention is to provide an improved displacement fluid suitable for injection into an oil-containing reservoir and subsequent displacement through the reservoir by flood water. Yet another object of the invention is to provide a soluble oil having a limited viscosity increase on taking up water. A further object of the invention is to provide a soluble oil composition in which the viscosity is not greatly effected by the addition of water to the soluble oil. Other objects and advantages will be apparent from the following description.

Briefly, this invention contemplates an improved soluble oil composition comprising a liquid hydrocarbon, a preferentially oil-soluble organic sulfonate, a preferentially water-soluble organic sulfonate, and a stabilizing agent that is useful as a displacement fluid in a flooding process. The composition is injected into the reservoir through an injection well and thereafter an aqueous flooding agent is injected to drive the soluble oil composition towards a spaced production well from which fluids are recovered. The soluble oil can be substantially anhydrous, or water can be present in the form of a water-in-oil microemulsion. In either case, it has been found that soluble oils compounded in accordance with this invention are less affected by the addition of water than are the prior art soluble oils, that more water can be absorbed before inversion to oil-in-water emulsions, and that improved oil recovery is attained when the soluble oils are used in a flooding process. The figure graphically illustrates the variation in viscosity of a conventional soluble oil system and of soluble oil systems of the present invention as a function of water content.

More specifically, this invention involves a flooding process in which oil is displaced from a subterranean oil-bearing reservoir by an improved soluble oil composition containing a mixture of surface active materials including both preferentially oil-soluble organic sulfonates and preferentially water-soluble organic sulfonates. In the practice of this invention, a slug of the improved soluble oil composition in the form of a substantially anhydrous liquid or a water-in-oil microemulsion is injected into the reservoir through one or more injection or input wells penetrating the oil-bearing formation and forced through the reservoir by subsequently injected flood water toward at least one production or output well similarly completed in the reservoir. As the flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front, such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which have the ability to spontaneously emulsify with water when admixed therewith. These soluble oils comprise a liquid hydrocarbon, a preferentially oil-soluble organic sulfonate, a preferentially water-soluble organic sulfonate, and a stabilizing agent. The emulsions formed by the addition of water to a soluble oil are of the water-in-oil type in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized, of course, that some cloudiness may appear at certain water concentrations without adversely effecting the utility of the microemulsion as a displacement agent. Emulsions of this type are designated microemulsions to distinguish them from ordinary water-in-oil macroemulsions in which the lower limit of the size of the water droplets is about 0.1 micron. At water concentrations above the inversion concentration, the emulsion inverts to an oil-in-water emulsion in which droplets of oil are dispersed in a continuous water phase. It is preferred that the water concentrations of the soluble oils of this invention be maintained below the inversion concentration so as to prevent inversion to emulsions of the oil-in-water type.

One of the major constituents of the improved soluble oil composition of this invention is a liquid hydrocarbon, which can comprise a crude petroleum oil, such as a crude oil previously recovered from the reservoir, or other conveniently available crude oil; a refined or semi-refined petroleum product, such as gasoline, naptha, stove oil, diesel and gas oil; a residual product obtained by the distillation of lower boiling fractions from a crude oil, such as bunker fuel oil and other residual products; a low value refinery by-product, such as catalytic cycle oil, lube oil extract, and the like; and liquefied normally gaseous hydrocarbous, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonate may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonate may exhibit some oil solubility, they are nevertheless characterized by markedly greater solubility in water.

One class of preferentially oil-soluble organic sulfonate particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene sulfonates and alkyl sodium polyaryl sulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weights of less than about 400 or which contain more than one sulfonic acid group per molecule. It has been found that in soluble oils compounded from petroleum crude oil or other high boiling hydrocarbons, superior results are obtained by employing as the preferentially oil-soluble organic sulfonate an alkyl aryl sulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as an alkyl aryl sulfonate or mixture of sulfonate which in the form of their sodium salts have molecular weights of more than about 400, and a preferentially water-soluble organic sulfonate, such as an alkyl aryl sulfonate or mixture of sulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "natural petroleum sulfonates" is a commercial designation of petroleum sulfonates which are obtained by a treatment of petroleum fractions, particularly solvent treated aromatic fractions, with sulfuric acid, fuming sulfuric acid or sulfur trioxide. Upon sulfonation, two types of general products are formed which are designated mahogany acid sulfonates and green acid sulfonates. The terminology is based on the colors imparted to the sulfonates in solution, a brownish color being imparted to the sulfonates which remain in the oil and the greenish color imparted to aqueous solutions made from the acid sludges formed in the sulfonation process. The mahogany sulfonates are preferentially oil-soluble and the green sulfonates are preferentially water-soluble.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water soluble agent. That is, the soluble oil compositions of this invention contain between about 1 to 12 parts of preferentially oil-soluble sulfonate per part of preferentially water-soluble sulfonate. Although the optimum surfactant combination is dependent upon the characteristics of the particular reservoir, in many operations it is found that superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated hydrocarbons such as monohydric and polyhydric alcohols, ketones, ethers and polyhydric alkyl ethers. Specific agents found particularly useful include isopropyl alcohol, secondary butyl alcohol, methyl ethyl ketone, ethylene glycol monoethyl ether (Cellosolve), ethylene glycol monobutyl ether (butyl Cellosolve), and diethylene glycol monobutyl ether (butyl Carbitol). The terms "Cellosolve" and "Carbitol" are trademarks of the Union Carbide Corporation.

It has been found that increased quantities of oil can be recovered from a subterranean petroleum reservoir by a flooding process utilizing a soluble oil containing both preferentially oil-soluble and preferentially water-soluble surface active materials than can be recovered by either conventional water flooding or by miscible water flooding with the prior art soluble oils formulated with oil-soluble organic sulfonates, or other conventional surface active materials. Also, the soluble oil compositions of this invention do not exhibit the large increase in viscosity on taking up water that are characteristic of the prior art soluble oil compositions. For example, with the soluble oil compositions of this invention, the peak viscosity at the inversion water concentration may be not more than 4 to 5 times the viscosity of the anhydrous soluble oil. In contrast, the viscosity increase may be in excess of 50 to 100 fold with the prior art soluble oils. A further unexpected advantage observed with the soluble compositions of this invention is that the inversion of the microemulsion from a water-in-oil emulsion to an oil-in-water emulsion occurs at a higher water content than experienced with the prior art soluble oils. Thus, the soluble oils of this invention will take up more water prior to inversion than will the prior art soluble oils.

The soluble oils useful in the practice of this invention can be prepared by any of the conventional techniques. One suitable method is to prepare a substantially anhydrous soluble oil by admixing the hydrocarbon base stock, the stabilizing agent and the preferentially oil-soluble surface active material. Thereafter, the preferentially water-soluble surface active material is added. Water-in-oil microemulsions can be prepared by simply adding a desired amount of water to the substantially anhydrous soluble oil. Preferably, the water employed in forming the microemulsion is a salt-containing fresh water having a dissolved salt content of less than about 15,000 p.p.m., and more preferably less than about 5000 p.p.m. Monovalent salts can be added to obtain a water having a desired salt content.

The composition of this invention comprises a mixture of about 45 to 90 volume percent liquid hydrocarbon, such as crude petroleum; 0.5 to 8 volume percent stabilizing agent, such as a partially oxygenated organic liquid; and 4 to 30 volume percent combined surface active materials containing both preferentially oil-soluble and preferentially water-soluble organic sulfonate in the previously disclosed proportions. This composition can also contain water present as a water-in-oil microemulsion in an amount up to that amount causing inversion to an oil-in-water emulsion. The soluble oil compositions of the invention can also comprise 45 to 75 volume percent liquid hydrocarbon, 3 to 8 volume percent stabilizing agent, 8 to 30 volume percent combined surface active materials containing both preferentially oil and water-soluble organic sulfonate surface active materials in the previously disclosed proportions, and 0 to 40 percent water. Also, where the liquid hydrocarbon has a relatively high viscosity, an additional quantity of low viscosity, light liquid hydrocarbon can be added to increase the mobility of the resulting soluble oil to obtain a more favorable mobility ratio between the soluble oil and the following drive fluid. The light hydrocarbon will usually not constitute more than 25 percent by volume of the resulting soluble oil.

The soluble oil prepared in the foregoing manner is then injected into the reservoir through one or more injection wells in an amount sufficient to establish in the reservoir a bank which can be displaced through the reservoir. Satisfactory oil recoveries can usually be obtained by the injection of 0.01 to 0.15 reservoir pore volume of soluble oil. Aqueous flooding medium is then injected to displace the soluble oil toward at least one production well spaced apart in the reservoir, from which fluids are produced in conventional manner. The aqueous flooding medium can comprise water or brine, and can be made more viscous by the addition of a thickening agent such as sugar, dextran, carboxymethyl cellulose, amines, glycerine, guar gum and mixtures of these agents. Also, the aqueous flooding medium can be rendered more viscous by the addition of a small amount of a water-soluble polymer, such as a polyacrylamide, and particularly a partially hydrolyzed polyacrylamide. In a preferred method of practicing this invention, thickening agent is added to only an initial portion of the flood water. Thus, in this preferred embodiment, 0.01 to 0.15 reservoir pore volume of soluble oil is injected into the reservoir and followed by 0.1 to 0.5 reservoir pore volume of thickened aqueous flooding medium. Thereafter, water or brine is injected to drive the previously injected fluids toward at least one spaced production well.

The invention is further illustrated by the following examples which are illustrative of specific modes of practicing the invention and are not intended as limiting the scope of the invention as defined by the appended claims.

EXAMPLE 1

The improved viscosity characteristic of the soluble oil composition of this invention is demonstrated by the following tests. A first substantially anhydrous soluble oil composition is prepared in accordance with the prior art by mixing 72 volume percent 39° API Illinois crude oil, 6.7 volume percent of butyl Cellosolve and 21.3 volume percent of a surface-active agent marketed by the Sonneborn Division of Witco Chemical Company, Inc. under the trademark Petronate CR. Petronate CR is an oil solution containing about 62 percent of preferentially oil-soluble alkyl aryl sulfonates having a molecular weight in the range of 490–510, and up to about 5 percent water. Tap water containing about 700 p.p.m. dissolved salts is then added to the soluble oil in incremental portions and the appearance of the resulting microemulsion is observed at each increment and its viscosity measured with a Brookfield viscosimeter equipped with a UL adapter and operated at a speed of 6 r.p.m. These data are reported in Table 1 and are illustrated in the drawing by curve A which shows the variation in viscosity as a function of water addition.

A second soluble oil composition in accordance with this invention is prepared by admixing 72.1 volume percent 39° API Illinois crude oil, 6.7 volume percent butyl Cellosolve, 18.3 volume percent Petronate CR, and 2.9 volume percent of a preferentially water-soluble surface-active agent marketed by the Sonneborn Division of Witco Chemical Company, Inc. under the trademark Pyronate 30. Pyronate 30 is an aqueous solution containing 30 percent preferentially water-soluble petroleum sulfonates having a molecular weight in the range of 330–350. The Pyronate 30 also contains about 10 percent mineral oil and about 10 percent inorganic salts. The ratio of prefentially oil-soluble active agent to preferentially water-soluble active agent is about 11.7 to 1. As before, water is incrementally added and the appearance and viscosity of the resulting microemulsion determined at each increment of water addition. These data are reported in Table 1 and are illustrated in the drawing by curve B.

A third soluble oil composition in accordance with this invention is prepared by admixing 70.9 volume percent Illinois crude oil, 6.6 volume percent butyl Cellosolve, 16.8 volume percent Petronate CR, and 5.9 volume percent Pyronate 30. The ratio of preferentially oil-soluble active agent to preferentially water-soluble active agent is about 5.2 to 1. As before, water is incrementally added and the appearance and viscosity of the resulting microemulsion determined at each increment of water addition. These data are reported in Table 1 and are illustrated in the drawing by curve C.

It is apparent from this data that the soluble oil compounded with both oil and water-soluble organic sulfonate surface-active agents exhibits a markedly different viscosity relationship on taking up water than does the soluble oil compounded with a single surface-active agent. On the addition of water to the soluble oil compounded with a single surface-active agent, a water-in-oil microemulsion is formed. The viscosity of the microemulsion increased to a value in excess of 1200 cp., and the microemulsion is transformed into a gelatinous mass by the addition of about 49 percent water. On the continued addition of water, the microemulsion is inverted to an oil-in-water emulsion. Similarly, a water-in-oil microemulsion is formed on the addition of water to soluble oils containing both oil and water-soluble surface-active organic sulfonates. In the case of the soluble oil containing 11.8 parts of preferentially oil-soluble surface active sulfonate per part of preferentially water-soluble sulfonate, the viscosity of the resulting microemulsion is increased to a peak of 79 cp. at about 60 percent water addition, whereupon the microemulsion is inverted to an oil-in-water emulsion. The maximum viscosity at the inversion point is further reduced to 45.8 cp. with the soluble oil containing the more optimum ratio of 5.2 parts of preferentially oil-soluble sulfonate per part of preferentially water-soluble sulfonate. With the soluble oil compounded with a single surface-active agent, a viscosity of 79 cp. corresponds to a water content of about 30 percent and a viscosity of 45.6 cp. to about 20 percent water. Also, the water content at inversion is increased from about 60 percent. Another advantage of the soluble oils of this invention is that the viscosity increase is small up to about 50 percent water. Thus, compounding the soluble oil with the preferred combination of surface-active organic sulfonates results in a marked reduction in the maximum viscosity encountered on the addition of water and increases the amount of water that can be absorbed prior to inversion.

TABLE 1.—EFFECT OF WATER ON SOLUBLE OIL STABILITY AND VISCOSITY

Soluble Oil Prepared with a Single Surfactant

| Water content, percent | Viscosity, cp. | Emulsion type | Appearance |
|---|---|---|---|
| 0 | 18 | w/o | Clear. |
| 6.25 | 25 | w/o | Do. |
| 16.7 | 38 | w/o | Do. |
| 25 | 60 | w/o | Do. |
| 33.6 | 87 | w/o | Cloudy. |
| 38 | 1,200 | w/o | Thick. |
| 49 | Gel | | Do. |
| 53 | 65 | o/w | Cloudy. |
| 64 | 11 | o/w | Do. |

Soluble oil prepared with a surfactant combination containing 11.7 parts of preferentially oil-soluble organic sulfonate per part of preferentially water-soluble organic sulfonate

| | | | |
|---|---|---|---|
| 0 | 17 | w/o | Clear. |
| 7.4 | 22 | w/o | Do. |
| 19.4 | 31 | w/o | Do. |
| 35.9 | 30 | w/o | Do. |
| 45.6 | 29 | w/o | Do. |
| 55 | 56 | w/o | Do. |
| 60 | 79 | | Do. |
| 63 | 34 | o/w | Cloudy. |
| 79 | 5 | o/w | Do. |

Soluble oil prepared with a surfactant combination containing 5.2 parts of preferentially oil-soluble organic sulfonate per part of preferentially water-soluble organic sulfonate

| | | | |
|---|---|---|---|
| 0 | 14.9 | w/o | Clear. |
| 7.4 | 20.5 | w/o | Do. |
| 13.8 | 22.4 | w/o | Do. |
| 28.6 | 22.8 | w/o | Do. |
| 31.0 | 22.0 | w/o | Do. |
| 35.5 | 21.8 | w/o | Do. |
| 39.4 | 21.6 | w/o | Do. |
| 42.9 | 21.8 | w/o | Do. |
| 46.0 | 22.7 | w/o | Do. |
| 48.7 | 23.7 | w/o | Do. |
| 51.3 | 28.7 | w/o | Do. |
| 53.5 | 35.5 | w/o | Do. |
| 55.6 | 42.7 | w/o | Do. |
| 57.5 | 45.8 | | Do. |
| 59.2 | 37.5 | o/w | Cloudy. |
| 61.6 | 19.0 | o/w | Do. |
| 65.0 | 9.2 | o/w | Do. |

EXAMPLE 2

A number of substantially identical test cores 6 feet long by 1½ inches in diameter are prepared by packing Lucite tubes with Nevada 130 sand. The cores are first saturated with brine and then with an Illinois crude oil having a gravity of 39° API. The cores are then flooded with brine to residual oil saturation. The improved oil recovery obtainable with the soluble oil compositions of this invention is demonstrated by the following tests which simulate a tertiary recovery operation on an oil reservoir previously subjected to water flooding.

The recovery obtainable by flooding with a prior art soluble oil composition is determined by injecting 0.025 pore volume of soluble oil in the form of a water-in-oil microemulsion into a first test core containing 29.3 percent residual oil. The microemulsion is prepared by admixing 69.2 volume percent Illinois crude oil, 6.4 volume percent butyl Cellosolve, 20.4 volume percent of preferentially oil-soluble surface-active agent marketed by the Sonneborn Division of Witco Chemical Company, Inc. under the trademark Petronate CR, and 4.0 volume percent tap water. Petronate CR is an oil solution containing about 62 percent of preferentially oil-soluble alkyl aryl sulfonates having a molecular weight in the range of 490–510 and up to about 5 percent water. The microemulsion is driven through the core by the injection of 0.40 pore volume of an aqueous flooding medium thickened by the addition of 0.2 weight percent of a partially hydrolyzed polyacrylamide marketed by the Dow Chemical Company under the trademark Pusher 500, and then by brine. The recovered oil is accumulated and its volume measured. The ultimate oil recovery is 83.8 percent of the residual oil-in-place exclusive of the amount of soluble oil injected.

A second core containing 28.0 percent residual oil is similarly treated with 0.025 pore volume of a microemulsion composition in accordance with this invention prepared by admixing 69.2 volume percent of 39° API Illinois crude oil, 6.4 volume percent butyl Cellosolve, 17.6 percent Petronate CR, 2.8 volume percent of a water-soluble surface-active agent marketed by the Sonneborn Division of Witco Chemical Company, Inc. under the trademark Pyronate 30, and 4.0 volume percent tap water. Pyronate 30 is an aqueous solution containing 30 percent preferentially water-soluble petroleum sulfonates having a molecular weight in the range of 330–350, about 10 percent mineral oil and about 10 percent inorganic salts. The ratio of preferentially oil-soluble surface-active agent to preferentially water-soluble agent is about 11.7 to 1. As before, the microemulsion is driven through the core by the injection of 0.40 pore volume of an aqueous flooding medium thickened by the addition of 0.2 weight percent of Pusher 500 and then by brine. The ultimate oil recovery is 84.5 percent of the residual oil-in-place, exclusive of the amount of soluble oil injected.

A third core containing 24.3 percent residual oil is treated with 0.025 pore volume of a more optimum microemulsion composition. This microemulsion is prepared by admixing 69.2 volume percent Illinois crude oil, 6.4 volume percent butyl Cellosolve, 11.7 volume percent Petronate CR, 8.7 volume percent Pyronate 30, and 4.0 volume percent tap water. The ratio of surface-active agents is about 2.5 parts of preferentially oil-soluble agent per part of preferentially water-soluble agent. The microemulsion is displaced through the core by the injection of 0.40 pore volume of an aqueous flooding medium thickened by the addition of 0.2 weight percent of Pusher 500, and then by brine. The ultimate oil recovery is 88.3 percent of the residual oil-in-place, exclusive of the amount of soluble oil injected.

Thus, it is apparent that oil recovery can be improved even in a tertiary recovery operation by flooding with a soluble oil containing both preferentially oil-soluble surface-active organic sulfonates and preferentially water-soluble surface-active organic sulfonates. The results of these tests are summarized in Table 2.

EXAMPLE 3

A flooding operation is conducted on an oil-containing reservoir in accordance with the method of this invention. Four injection wells are arranged in a rectangular pattern around a single centrally located production well. A displacement fluid comprising a microemulsion prepared by admixing 50 percent previously recovered crude oil, 5 percent isopropyl alcohol, 10 percent gasoline, 10 percent preferentially oil-soluble alkyl aryl sulfonate, 5 percent preferentially water-soluble alkyl aryl sulfonate, and 20 percent water. The microemulsion is injected into each of the injection wells at injection rates of about 35 barrels per day until a total amount of microemulsion equivalent to about 0.10 reservoir pore volume is injected. Thereafter, aqueous flooding medium is injected into the reservoir through each of the injection wells and petroleum and other produced fluids are recovered from the central producing well.

EXAMPLE 4

A flooding operation similar to that described in Example 3 is conducted in which a substantially anhydrous soluble oil is injected into formation and driven therethrough by a subsequently injected aqueous flooding medium. The soluble oil is prepared by admixing 70 percent previously recovered crude oil, 7.0 percent butyl Cellosolve, and 23 percent of mixed alkyl aryl sulfonate having an average molecular weight of about 450 and containing both preferentially oil-soluble and preferentially water-soluble sulfonates.

EXAMPLE 5

Compositions prepared by admixing

|  | Composition, volume percent | | | | |
|---|---|---|---|---|---|
|  | 5-A | 5-B | 5-C | 5-D | 5-E |
| Crude petroleum | 69.2 | 69.1 | 69.2 | 69.3 | 69.2 |
| Butyl Cellosolve | 6.4 | 6.4 | 6.4 | 3.8 | 6.4 |
| Combined sulfonate [1] | 20.4 | 20.5 | 20.4 | 23.1 | 20.4 |
| Water [2] | 4.0 | 4.0 | 4.0 | 3.8 | 4.0 |
| Ratio [3] | 12.0/1 | 5.2/1 | 2.8/1 | 4.2/1 | 1.0/1 |

[1] An admixture of preferentially oil-soluble organic sulfonates having molecular weights in the range of 490–510 containing about 62% sulfonate and preferentially water-soluble organic sulfonates having molecular weights in the range of 330–350 containing about 30 percent sulfonates.
[2] Water contains about 700 p.p.m. dissolved salts.
[3] Ratio of the parts by volume of preferentially oil-soluble sulfonate per per part of preferentially water-soluble sulfonate.

EXAMPLE 6

A composition formed by admixing

|  | Vol., percent |
|---|---|
| 37° API Texas crude oil | 81.5 |
| Secondary butylalcohol | 2.0 |
| Combined sulfonates [1] | 16.5 |
| Ratio [2] |  |

[1] An admixture of preferentially oil-soluble organic sulfonates having molecular weights in the range of 500–520 containing about 62% sulfonate and preferentially water-soluble organic sulfonates having molecular weights in the range of 330–350 containing about 30 percent sulfonates.
[2] Ratio of the parts by volume of preferentially oil-soluble sulfonate per part by volume of preferentially water-soluble sulfonate.

TABLE 2

| Run No. | Microemulsion composition, volume percent | Ratio [1] | Microemulsion, slug size, pore volume | Initial core saturation, percent | | Ultimate oil recovery, percent oil-in-place |
|---|---|---|---|---|---|---|
|  |  |  |  | Oil | Water |  |
| 1 | 69.2 Illinois crude oil; 6.4 butyl Cellosolve; 20.4 Petronate CR; 4.0 water. |  | 0.025 | 29.3 | 70.7 | 83.8 |
| 2 | 69.2 Illinois crude oil; 6.4 butyl Cellosolve; 17.6 Petronate CR; 2.8 Pyronate 30; 4.0 Water. | 11.7 | 0.025 | 28.0 | 72.0 | 84.5 |
| 3 | 69.2 Illinois crude oil; 6.4 butyl Cellosolve; 11.7 Petronate CR; 8.7 Pyronate 30; 4.0 water. | 2.5 | 0.025 | 24.3 | 75.6 | 88.0 |

[1] Oil-soluble/water-soluble surface-active agent.

EXAMPLE 7

A composition formed by admixing

| | Vol., percent |
|---|---|
| Gas oil | 76.1 |
| Combined sulfonate [1] | 17.2 |
| Butyl Cellosolve | 1.8 |
| Water | 4.9 |
| Ratio [2] | 3.2/1 |

[1] An admixture of preferentially oil-soluble organic sulfonates having molecular weights in the range of 500–520 containing 62% sulfonates and preferentially water-soluble organic sulfonates having molecular weights in the range of 330–350 containing about 30% sulfonates.
[2] See footnote 3 to table of Example 5.

EXAMPLE 8

The compositions formed by admixing

| | Volume, percent | | |
|---|---|---|---|
| | 8A | 8B | 8C |
| Crude petroleum | 73.6 | 74.2 | 74.0 |
| Methyl ethyl ketone | 3.1 | | |
| Carbitol | | 3.0 | |
| Butyl Carbitol | | | 3.0 |
| Combined sulfonate [1] | 21.6 | 21.7 | 22.0 |
| Water | 1.7 | 1.1 | 1.0 |
| Ratio [2] | 11.5/1 | 11.6/1 | 11.6/1 |

[1] An admixture of preferentially oil-soluble alkyl aryl sulfonates having molecular weights in the range of 490–510 containing about 62% sulfonates and preferentially water-soluble sulfonates having molecular weights in the range of 330–350 containing about 30 percent sulfonates.
[2] See footnote 3 to table of Example 5.

EXAMPLE 9

The composition formed by admixing

| | Vol., percent |
|---|---|
| Crude petroleum | 39.5 |
| Butyl Cellosolve | 0.9 |
| Alkyl aryl sulfonates: | |
| 490–510 mol wt.[1] | 3.2 |
| 440–470 mol wt.[1] | 3.5 |
| 330–350 mol wt.[2] | 2.9 |
| Water containing 12,000 p.p.m. monovalent salts | 50.0 |
| Ratio [3] | 4.7/1 |

[1] Approximately 62% sulfonates.
[2] Approximately 30% sulfonates.
[3] See footnote (3) to table of Example 5.

EXAMPLE 10

The compositions formed by admixing

| | Volume, percent | | |
|---|---|---|---|
| | 10A | 10B | 10C |
| Gasoline | 60.0 | 45.0 | 60.0 |
| Isopropyl alcohol | 5.0 | 4.0 | 5.0 |
| Alkyl aryl sulfonates: | | | |
| 440–470 molecular weight [1] | 22.0 | 14.0 | |
| 400–430 molecular weight [1] | | | 22.0 |
| 300–400 molecular weight [2] | 8.0 | 5.0 | 8.0 |
| Water | 5.0 | 32.0 | 5.0 |
| Ratio [3] | 5.8/1 | 5.7/1 | 5.8/1 |

[1] Approximately 62% sulfonates.
[2] Approximately 30% sulfonates.
[3] See footnote (3) to table of Example 5.

EXAMPLE 11

The compositions formed by admixing

| | Volume, percent | | | |
|---|---|---|---|---|
| | 11A | 11B | 11C | 11D |
| Crude petroleum | 45.0 | 58.0 | 80.0 | 90.0 |
| Butyl Cellosolve | 0.5 | 8.0 | 8.0 | 0.5 |
| Organic sulfonates: | | | | |
| 400–550 molecular weight [1] | 7.1 | 14.0 | 6.0 | 4.5 |
| 300–400 molecular weight [2] | 7.4 | 16.0 | 6.0 | 5.0 |
| Water | 40.0 | 4.0 | | |
| Salt content, [3] p.p.m. | 12,000 | 5,000 | | |
| Ratio [4] | 2.0/1 | 1.8/1 | 2.1/1 | 1.9/1 |

[1] Approximately 62% sulfonates.
[2] Approximately 30% sulfonates.
[3] Salt content expressed as parts of salt per million parts of water.
[4] See footnote (3) to table of Example 5.

Various embodiments and modifications of this invention have been described in the foregoing description and examples, and further modifications will be apparent to those skilled in the art. Such modifications are included within the scope of this invention as defined by the following claims.

Having now described the invention, I claim:

1. An oil external soluble oil composition comprising 45 to 90 volume percent liquid hydrocarbon selected from the group consisting of crude petroleum and fractions thereof; 0.5 to 8 volume percent stabilizing agent selected from the group consisting of isopropyl alcohol, secondary butyl alcohol, methyl ethyl ketone, ethylene glycol monoethyl ether, ethylene glycol monobutyl ether and diethylene glycol monobutyl ether; and 4 to 30 volume percent surface active agents comprising both preferentially oil-soluble alkyl aryl sulfonates and preferentially water-soluble alkyl aryl sulfonates, said sulfonates being present in the proportion of about 1 to 12 parts of preferentially oil-soluble sulfonate per part of said preferentially water-soluble sulfonate.

2. The composition defined in claim 1 wherein said preferentially oil-soluble alkyl aryl sulfonates in the form of their sodium salts have a molecular weight above about 400, and where said preferentially water-soluble alkyl aryl sulfonates in the form of their sodium salts have a molecular weight of less than about 40 or are alkyl aryl polysulfonates.

3. The composition defined in claim 1 wherein said liquid hydrocarbon is crude petroleum.

4. The composition defined in claim 3 wherein said preferentially oil-soluble alkyl aryl sulfonates in the form of their sodium salts have a molecular weight in the range of about 450 to 550.

5. The composition defined in claim 1 which includes a light liquid hydrocarbon to reduce the viscosity of the soluble oil.

6. The composition defined in claim 1 including water present in the form of a water-in-oil microemulsion.

7. The composition defined in claim 6 including a water-soluble monovalent salt in an amount up to about 15,000 parts per million parts of water.

8. The composition defined in claim 6 wherein said water is present in an amount less than about 10 volume percent.

9. The composition defined in claim 1 including 0 to 40 volume percent water present in the form of a water-in-oil microemulsion.

10. An oil-external soluble oil composition comprising 45 to 90 volume percent liquid hydrocarbon selected from the group consisting of crude petroleum and fractions thereof; 0.5 to 8 volume percent ethylene glycol monobutyl ether; and 4 to 30 volume percent of combined preferentially oil-soluble surface active alkyl aryl sulfonates that in the form of their sodium salts have molecular weights above about 400 and preferentially water-soluble surface active alkyl aryl sulfonates that in the form of their sodium salts have molecular weights of less than about 400 or are alkyl aryl polysulfonates, said sulfonates being present in the proportion of about 1 to 12 parts of preferentially oil-soluble sulfonate per part of said perferentially water-soluble sulfonate.

11. The composition defined in claim 10 wherein said preferentially oil-soluble surface active alkyl aryl sulfonates in the form of their sodium salts have a molecular weight in the range of about 450 to 550.

12. The composition defined in claim 10 which includes a light liquid hydrocarbon to reduce the viscosity of the soluble oil.

13. The composition defined in claim 10 including water present in the form of a water-in-oil microemulsion.

14. The composition defined in claim 13 including a water soluble monovalent salt in an amount up to about 15,000 parts per million parts of water.

15. The composition defined in claim 13 wherein said water is present in an amount less than about 10 volume percent.

16. The composition defined in claim 10 including 0 to 40 volume percent water present in the form of a water-in-oil microemulsion.

17. An oil-external soluble oil composition comprising:
45 to 90 volume percent crude petroleum;
0.5 to 8 volume percent of a stabilizing agent selected from the group consisting of secondary butyl alcohol, ethylene glycol monoethyl ether, ethylene glycol monobutyl ether and diethylene glycol monobutyl ether;
4 to 30 volume percent of combined preferentially oil-soluble surface active alkyl aryl sulfonate that in the form of its sodium salt has a molecular weight in the range of about 450 to 550 and a preferentially water-soluble surface active alkyl aryl sulfonate that in the form of its sodium salt has a molecular weight of less than about 400 or is an alkyl aryl polysulfonate, said surface active agents being present in the proportion of about 1 to 12 parts of preferentially oil-soluble sulfonate per part of said preferentially water-soluble sulfonate; and
water present in the form of a water-in-oil microemulsion.

18. The composition defined in claim 17 including a water soluble monovalent salt in an amount up to about 15,000 parts per million parts of water.

19. The composition defined in claim 17 wherein said water is present in an amount less than about 10 volume percent.

20. An oil-external soluble oil composition consisting essentially of 45 to 75 volume percent liquid hydrocarbon selected from the group consisting of crude petroleum and fractions thereof, 3 to 8 volume percent stabilizing agent selected from the group consisting of isopropyl alcohol, secondary butyl alcohol, methyl ethyl ketone, ethylene glycol monoethyl ether, ethylene glycol monobutyl ether and diethylene glycol monobutyl ether and 8 to 30 volume percent surface active agents comprising both preferentially oil-soluble alkyl aryl sulfonates and preferentially water-soluble alkyl aryl sulfonates in the ratio of from 1 to 12 parts of preferentially oil-soluble agent per part of preferentially water-soluble agent.

21. The composition defined in claim 20 wherein said preferentially oil-soluble alkyl aryl sulfonates in the form of their sodium salts have a molecular weight above about 400, and wherein said preferentially water-soluble alkyl aryl sulfonates in the form of their sodium salts have a molecular weight of less than about 400 or are alkyl aryl polysulfonates.

22. The composition defined in claim 20 wherein said liquid hydrocarbon is crude petroleum.

23. The composition defined in claim 22 wherein said preferentially oil-soluble alkyl aryl sulfonate in the form of its sodium salt has a molecular weight in the range of about 450 to 550.

24. The composition defined in claim 22 which includes a light liquid hydrocarbon to reduce the viscosity of the soluble oil.

25. The composition defined in claim 20 including 0 to 40 volume percent of water present in the form of a water-in-oil microemulsion.

26. The composition defined in claim 1 wherein said surface active agents are present in the proportion of about 1 to 4 parts of preferentially oil-soluble agent per part of preferentially water-soluble agent.

References Cited

UNITED STATES PATENTS

| | | | |
|---|---|---|---|
| 3,307,628 | 3/1967 | Sena | 166—274 X |
| 3,013,973 | 12/1961 | Bennett | 252—49.5 X |
| 3,163,214 | 12/1964 | Csaszar | 252—8.55 X |
| 3,254,714 | 6/1966 | Gogarty et al. | 166—274 X |
| 3,330,343 | 7/1967 | Tosch et al. | 252—8.55 X |
| 3,348,611 | 10/1967 | Reisberg | 166—275 X |
| 3,468,377 | 9/1969 | Dunlap et al. | 166—274 |
| 3,477,511 | 11/1969 | Jones et al. | 166—275 X |

HERBERT B. GUYNN, Primary Examiner

H. A. PITLICK, Assistant Examiner

U.S. Cl. X.R.

166—273, 274, 275; 252—49.5, 309

UNITED STATES PATENT OFFICE
CERTIFICATE OF CORRECTION

Patent No. 3,697,424          Dated October 10, 1972

Inventor(s) LeRoy W. Holm

It is certified that error appears in the above-identified patent and that said Letters Patent are hereby corrected as shown below:

Claim 2, column 12, line 25, -- 40 -- should be -- 400 --.

Signed and sealed this 3rd day of April 1973.

(SEAL)
Attest:

EDWARD M. FLETCHER, JR.          ROBERT GOTTSCHALK
Attesting Officer          Commissioner of Patents